United States Patent [19]

Intrater et al.

[11] 4,396,677

[45] * Aug. 2, 1983

[54] METAL, CARBON, CARBIDE AND OTHER COMPOSITES THEREOF

[76] Inventors: Josef Intrater, 125 Demarest Ave., Englewood Cliffs, N.J. 07632; Gene Bertoldo, 306 W. 51 St., New York, N.Y. 10019

[ * ] Notice: The portion of the term of this patent subsequent to Nov. 9, 1999, has been disclaimed.

[21] Appl. No.: 242,716

[22] Filed: Mar. 11, 1981

Related U.S. Application Data

[63] Continuation-in-part of Ser. No. 200,514, Oct. 24, 1980, which is a continuation-in-part of Ser. No. 157,310, Jun. 9, 1980, abandoned.

[51] Int. Cl.$^3$ .............................................. B32B 15/02
[52] U.S. Cl. ...................... 428/408; 420/557; 420/563; 427/113; 427/403; 427/404; 428/367; 428/368; 428/432; 428/433
[58] Field of Search .............. 428/408, 367, 368, 432, 428/433, 450, 469, 472, DIG. 902, 615, 627, 632, 634, 641, 644, 645; 427/113, 403, 404; 75/175 R, 175 A, 166 R, 166 B, 166 C, 166 D, 134 R

[56] References Cited

U.S. PATENT DOCUMENTS

| | | | |
|---|---|---|---|
| 1,098,794 | 6/1914 | Fleming | 428/367 |
| 2,636,820 | 4/1953 | Bolton | 75/175 R |
| 2,636,856 | 4/1953 | Suggs et al. | 204/290 S |
| 2,866,724 | 12/1958 | Alexander | 427/250 |
| 2,929,741 | 3/1960 | Steinberg | 427/249 |
| 3,351,543 | 11/1967 | Vanderslice | 428/408 |
| 3,393,084 | 7/1963 | Hartwig | 427/249 |
| 3,417,460 | 12/1968 | Galmiche | 228/121 |
| 3,484,210 | 12/1969 | Pinter | 428/408 |
| 3,663,191 | 5/1972 | Kroder | 428/644 |
| 3,673,038 | 6/1972 | Canonico et al. | 428/634 |
| 3,713,790 | 1/1973 | Takamori et al. | 29/195 |
| 3,747,173 | 7/1973 | Lind | 29/25.13 |
| 3,860,443 | 1/1975 | Lachman et al. | 247/214 |
| 4,104,417 | 8/1978 | Sara | 427/37 |
| 4,104,441 | 8/1978 | Fedoseev et al. | 428/408 |

FOREIGN PATENT DOCUMENTS

| | | | |
|---|---|---|---|
| 1171855 | 12/1969 | United Kingdom | 427/113 |
| 1447356 | 9/1972 | United Kingdom | |

OTHER PUBLICATIONS

Naidich et al., "Investigation of the Wetting of Diamond and Graphite Bimolten Metals and Alloys," Institute of Material Problems, Academy of Science, Ukr. SSR, translated from *Poroshkovaya Metallurgiya*, No. 3(21), pp. 23-28, May-Jun. 1964.

Chemical Abstracts, vol. 85, 1976, p. 181398J.

Naidich et al., "Study of the Wetting of Diamond and Graphite by Liquid Metals", Institute of Cermets and Special Alloys, Academy of Sciences, Ukr. SSR, translated from *Poroshkovaya Metallurgiya*, No. 1(13), pp. 49-53, Jan.-Feb. 1963.

Vlasov, A. S. et al., "Study of the Conditions for Coating Carbon Fibers with Carbides", Chemical Abstracts, vol. 55, No. 20, Nov. 15, 1976, p. 340, Abstract 148015j.

Naidich et al., "Investigation of the Wetting of Graphite and Diamond by Fused Metals and Alloys", *Poroshkovaya Metallurgiya*, No. 6(6), pp. 55-60, (1961), (Contains an English Abstract).

*Primary Examiner*—W. Stallard
*Attorney, Agent, or Firm*—Fred A. Keire

[57] ABSTRACT

As an article for manufacture, a tin, lead, indium, and alloys of each, admixed with a carbide or carbonyl former, for forming these with said tin, lead and indium, and their alloys into an "active" alloy form; these "active" alloy forms are suitable for making wettable carbon, graphite, diamond, sapphire, alumina, metal carbide, quartz, silicon metal, etc., composites which will not dewet upon heating but form strong bonds; methods for preparing said composites of various shapes, layers, coatings, and sandwiches; alloys, preforms and various metal-graphite, diamond, sapphire, alumina, metal carbide, quartz, silicon metal etc., structures also disclosed.

33 Claims, No Drawings

METAL, CARBON, CARBIDE AND OTHER COMPOSITES THEREOF

This application is a continuation-in-part of U.S. application Ser. No. 200,514 filed Oct. 24, 1980; now allowed, which in turn is a continuation-in-part of U.S. application Ser. No. 157,310, filed June 9, 1980 and now abandoned.

This invention pertains to carbon, graphite, diamond, silicon metal, quartz, aluminum oxide (alumina), metal carbide etc. composites; more specifically, this invention pertains to composites of tin, lead, indium and alloys of same in a composite with the above materials as substrates. These substrate materials are composites with an adherent layer of tin, lead, indium or alloys of each, in which layer each of the foregoing is in an admixture with at least one carbide or carbonyl former, as metal. This admixture produces by melting and/or dissolving, in a carbon monoxide atmosphere, an "active" alloy which bonds to the above recited substrates. The herein disclosed "active" alloys also appear to be novel alloys as these alloys appear to contravene presently known phase diagrams, e.g. for tin-chromium alloys.

Specifically, this invention pertains to a graphite, carbon, diamond, silicon, silica, e.g. quartz, alumina, sapphire, metal carbide, etc., substrates united with tin or tin alloy, in the "active" alloy form. The conjointly formed composition to produce the "active" alloy, may be a novel alloy composition, the chemical nature of which has not been elucidated, but which, when separately formed, and not in accordance with the present method, would not form an "active" alloy which is capable of forming a tin wettable substrate composite.

Further joining of the "active" alloy coating with compatible alloying or brazeable materials, e.g., copper, molybdenum, etc., with tin allows the formation of composites such as sandwich composites of various combinations having graphite, diamond, silicon, silica, e.g. quartz, alumina, sapphire, metal carbide, etc., as substrates, with tin and a metal alloyable with tin forming the joint, in various sandwich arrangements of the above materials. Still further, instead of tin, as the preferred metal, alloys of the tin are next most desirable and are within the scope of this invention, such as alloys of tin and lead. Moreover, lead and/or indium, instead of tin, are also practicable as base metals for forming the mentioned composites. The "active" alloy forms are then based on tin, lead, or indium or their alloy.

Additionally, preforms of tin, lead, indium metals, alloys of tin, lead and indium and a carbide or carbonyl former such as chromium, nickel, vanadium etc., have been obtained, which when cast and shaped, can then be used in shapes such as discrete elements, e.g. shims, foils or leaves placed on or interleaved with graphite, silicon, silica, diamond, quartz, alumina, sapphire, metal carbide, etc. and, upon heat fusing, joined to said substrates to provide a composite for soldering or joining or fusing the composite to other substrates, e.g., graphite and/or silicon. As part of the present invention, metallurgically "active" metals, which form apparently atomically bound composites, have been discovered that, upon deposition on the above recited substrates, will have, such as for tin-lead-chromium alloy, zero or negative angles of wetting of said substrates. Graphite composites that have been formed with tin and copper can withstand repeated heating to 550° C. and quenching, whithout noticeable weakening in the formed bond.

The disclosed "active" alloy, the precursor components and substrate materials are also useful in particulate form for making various shapes thereof such as abrasives (abrasive wheels) or composite abrasive wheels.

DISCUSSION OF THE BACKGROUND OF THE INVENTION

Carbon which, in general, and for the purposes of present disclosure, includes graphitic materials, and can range from the highly graphitic types of carbon to low temperature (1000° C. to 1400° C.) baked carbonaceous articles, carbon fibers and diamond. Carbon possesses properties which make carbon an excellent material for high temperature applications as a substrate material. Moreover, amongst the desirable properties, carbon, such as graphite, possesses good thermal shock resistance, a high sublimation temperature point, and an increase in strength with increasing temperature (up to 2200° C.). Carbon, however, tends to oxidize in an oxidizing atmosphere.

In prior practice, a number of carbon composites have been formed and graphite has been coated with a number of combinations of metals such as chromium, titanium, hafnium, zirconium, vanadium, niobium, tantalum, tungsten and molybdenum. However, it has been found that when graphite has been coated with these carbide or carbonyl forming metals, the subsequent deposition of tin results in a dewetting of tin upon the heating of the graphite substrate.

Consequently, the traditional coating elements such as disclosed in U.S. Pat. Nos. 3,393,084, 4,104,417, 3,860,443, 2,866,724 and 2,636,856 and even those disclosed and found in U.S. Pat. No. 1,098,794 have failed to provide for a composition which would be a non-tin dewetting graphite composite.

BRIEF DESCRIPTION OF THE PRESENT INVENTION

It has now been found that the metal dewetting of hard to bond substrates such as a graphite and the other above-mentioned substrates, is avoided when it is coated with tin, a tin alloy, lead, lead alloys, and/or indium and indium alloys. Tin and tin alloys are the preferred materials. When these metals or alloys are admixed with a carbide or carbonyl former and the coating is effected in a carbon monoxide atmosphere, with graphite or the other substrates having an intermediate layer of the "active" alloy of the above type, formed in-situ from admixed powders, or preformed as "active" alloys, as will be explained herein, unexpectedly and surprisingly, dewetting can be avoided as a result of a synergistically related interaction of the tin, a tin alloy, lead, a lead alloy, and/or indium and indium alloy, and an element of the carbide or carbonyl forming group, causing a conjoint combination of tin, a tin alloy, lead, a lead alloy, and/or indium or indium alloy with graphite or the other substrates previously recited. The element causing the novel "active" state of the metal is an element which forms metallurgically a carbide and/or a metal which forms a carbonyl, e.g. a metal forming carbides such as chromium, titanium, hafnium, zirconium, vanadium, niobium, tantalum, tungsten, molybdenum and iron; as carbonyl formers, metals such as manganese, nickel, cobalt, iron, etc. are included as carbonyl formers (some of these are also carbide formers). Although the precise reason for the "active" state of the tin etc. alloys with these metals is not known, it has been found that carbon monoxide atmosphere is conducive of producing these "active" metals in alloy forms with the recited group of tin, lead or indium. These alloys could not be obtained previously at all or not in an active form because of phase separation or immiscibility of e.g. the tin-metal combination. One such example is the combination of tin with chromium which cannot be formed by melting due to immiscibility. As now formed from powder form, in carbon monoxide atmosphere, e.g. tin-chromium, it forms alloys which were heretofore unknown for their properties, e.g. in the "active" melting form adhering onto graphite. Other alloy combinations such as tin-vanadium-nickel, tin-molybdenum-nickel, tin-chromium-nickel, etc. have been found to display these "active" alloy properties.

These properties allow a composite to be formed which will not dewet upon reheating of the same when tin, a tin alloy, lead, a lead alloy, indium or an indium alloy is further deposited thereon, (as well as thereafter and subsequent to the formation of the novel layer adheringly attached to graphite or the other substrates).

Thus, it has been found that when graphite or the other substrates have been coated and a composite formed with tin, a tin alloy, lead, a lead alloy and/or indium and an indium alloy (hereafter collectively the "tin group" metals), in combination with the carbide or carbonyl forming elements of the above recited group of compounds (but only upon a conjoint deposition or proper "active" alloy preform formation), and then this composite joined such as with tin or a tin alloy coating or layer, lead or lead alloy coating or layer, on carbon or graphite and/or the other substrates, these form the "active" alloys upon heating at an appropriate temperature, e.g., up to 1000° C. in a carbon monoxide atmosphere, a non-dewettable carbon or graphite (and/or the other substrate), composite. Subsequent brazing of, e.g., tin with other metals, such as copper, provides a number of possible composites or sandwiches of, e.g. graphite structures.

Of the carbide or carbonyl forming elements, chromium, titanium, hafnium, zirconium, vanadium, niobium, tantalum, tungsten, molybdenum, nickel, iron, cobalt, or manganese, are used as metals, and when admixed in combination with tin in a colloidal dispersion (the carbide or carbonyl former metal is up to 10% to 15% metal to tin in the mixture but may be as low as 1%, but typically 5%, such as for chromium, iron, nickel, etc.), and subsequently heated up to about, at or above 1000° C. in a carbon monoxide atmosphere, the carbide forming or carbonyl forming metal and tin will, apparently, "react" with each other or with a graphite. The formed coating will not dewet and will not dewet tin upon subsequent deposition of a tin coating thereon, and will not dewet when the substrate and deposit are heated. When the coating is formed, zero or negative angle of wetting characterizes these coatings with their substrate.

When one or more than one of the carbide or carbonyl forming metals is used, these compositions will have the "tin group" metals as low as the solubility in carbon monoxide atmosphere will permit, but typically from about 1%, but 2.5% to about 15%, or as much as 20% to 30% may be used of the carbide or carbonyl former (as metal), the balance being the "tin group" metal; the middle range of 2.5% to 15% is more typical. Further, heating the composite at a lower temperature, e.g., 600° C. to 900° C. with a copper overlay forms a bronze composite on graphite which withstands higher temperatues, e.g. 700° C. to 800° C. Substantially the entire surface of graphite may be coated and oxidation of graphite thus prevented by the less oxidizeable coating.

Although the exact mechanism or reasons for this phenomenon are not known, the surprising synergistic interaction is believed to be the following. When, e.g. graphite and tin compete for atomic attraction for the carbide or carbonyl forming elements such as chromium, a film of intimately distributed tin and chromium regions are evenly dispersed on graphite. Whether the continuous film is a composite or a bound intermetallic composition of chromium, tin and graphite, it is not known. However, subsequent heating of this film or a further tin coating on this film does not cause tin dewetting on the graphite. A tin coating, therefore, when subsequently deposited on the conjointly deposited composition is bound in some form to it and apparently graphite and thus provides a strongly adhering and satisfactorily functioning graphite composite. Thus, when the graphite composite is first formed with such a film as described above and subsequently additional layers of tin are coated thereon, tin may be deposited at any thickness without dewetting thereof.

Surprisingly, it has also been found that a very highly adherent joint or interface can be formed, not only between tin and carbon as described above, but also between lead and indium and alloys thereof, and the above metal mixture, e.g., lead and chromium mixture with graphite (at about the same proportions as given for tin and the metal), and thereby provide desirable composites which are more inert to oxidizing atmosphere.

Still more surprisingly, it has been found that the above "active" metals formed in-situ or as preforms when deposited on many very hard to coat materials such as the recited substrates, form a tightly adhering coating which is believed to be atomically bound to the substrate. Bond strengths of heretofore unknown magnitude have been observed which tends to support the "atomic" bond interpretation of these results.

Other metals besides chromium which have been usefully joined in the above combination of tin-metal-graphite are vanadium and titanium. Further examples will be given below.

The group of carbonyl or carbide formers which are useful because of their availability, are chromium, manganese, molybdenum, vanadium, tungsten, iron, cobalt, or nickel. Other, but cost-wise not as advantageous, carbonyl or carbide formers are rhenium, ruthenium, rhodium, osmium and iridium. Besides the above mentioned carbide formers, zirconium, hafnium and tantalum are also mentioned, but cost wise are not desirable because these are very expensive. Because of toxicity, nickel or iron carbonyls are dangerous and extreme caution must be excercised in use, although these function for the alleged purpose and may not necessarily form carbonyls under the process conditions. Typically, the high temperature atmosphere at which the interface is formed is a carbon monoxide atmosphere, cooling the composite, however, can be carried out in a hydrogen or a hydrogen-nitrogen atmosphere (95% to 25% hydrogen, balance nitrogen). Carbon monoxide atmosphere is the preferred atmosphere, especially when non-carbon substrates are coated, and when preforms are formed from the powder form precursor materials. Powder form of the tin metals and the carbide and carbonyl formers, as metals, is believed to facilitate the carbon monoxide access in the unknown reaction, forming the "active" alloys. Powder sizes are not restrictive but can vary from colloidal to particulates of up to 2 or 3 millimeters.

Any metal which has a sufficient solubility in the interface composite can thereafter be alloyed with the interface deposit. Those alloying metals capable of increasing (or decreasing) temperature limits are desirable, depending on the purpose, e.g., for lower or higher temperature solder for higher temperature reinforcement such as copper (for bronze formation), etc.

GENERAL EXAMPLE

A. Direct Film or Layer Formation

A method of codeposition of tin, lead or indium alloys or alloyable mixtures thereof, was achieved by the use of colloidal suspension of a powder or tin, lead, indium or alloys of each, and an element which is a carbide or carbonyl former such as of the group recited above. As a dispersant, for the colloidal suspension of these components, alcohol, water, or any fast drying liquid has been employed. Although it is not known if residual water content, the oxygen thereof, or the oxide film, if any, contribute to the formation of the film layer, it has been found that employment of the colloidal suspension with the variation of tin, lead or indium and at least one carbide or carbonyl former in the ratio, such as from 99% to 1%, typically about 95% to 5%, further 85% to 15%, 80% to 20% but more broadly from 60% to 40% by weight to 40% to 60% by weight gives the "active" form of the admixture resulting in the "active" alloy. The carbide or carbonyl former with tin, lead, indium, or alloy composition of each (the "tin metal" group), will form an interlayer element or film or coating which has the necessary affinity to the carbon surface, or to the other substrates, giving the non-dewettable layer. Subsequent coating thereon of tin, lead, indium or alloys of each or other brazeable alloy combinations is then readily accomplished.

As a general practice, the carbon or substrate shape is immersed in this colloidal suspension and then air dried. Subsequent annealing in a carbon monoxide atmosphere at the temperature from 600° C. and above 1000° C. (but depending on the carbide or carbonyl forming element chosen, may be as high as 1500° C.) produces the film which has been found so suitable for allowing subsequent additional tin, lead or indium coatings on the, e.g. carbon substrate.

Typically chromium-tin mixtures of various proportions were annealed at 800° C., 900° C. and 1000° C. in carbon monoxide atmosphere.

When changing the ratios of, for example, tin and chromium powders and varying the amount of the liquid, various thicknesses of the initial film may be obtained which then can be overcoated with tin. A coating is generally of a thickness sufficient to cover the surface and generally is from about a few microns up to a sufficient thickness to provide the desired properties—½ mill under most circumstances will be sufficient. A carbon surface prepared as above was able to receive additional amounts of tin, lead or indium or alloyable deposits thereon in one or more steps.

When following the example given above, the following combinations of substrates and "active" alloy coatings were formed at the indicated conditions; alumina (aluminum oxide) or sapphire (single crystal aluminum oxide), with 80% tin, 10% vanadium, 10% nickel, in carbon monoxide atmosphere (100% CO) at about 1000° C.; quartz with 80% tin, 10% molybdenum, 10% nickel at about 1000° C. in CO atmosphere (100%); silicon carbide with 80% tin, 10% chromium, 10% nickel at about 1000° C. in CO atmosphere (100%); silicon (metal) with 90% tin, 10% molybdenum, at about 900° C. and in carbon monoxide (100%) atmosphere; diamond with 80% tin, 10% nickel, 10% vanadium or 95% tin with 5% iron at 1000° C. in carbon monoxide atmosphere. All percentages herein are by weight, unless otherwise stated.

B. Preform Fabrication and Composite or Sandwich Production

It was also found that when tin-alloy, e.g., of 60% tin—40% lead was used and to this composition chromium powder was added in a percent weight range from 15% to 1% but more typically from 10% to 3%, preferably 7 to 5%, and the composition was heated in a carbon monoxide atmosphere in a crucible of quartz or aluminum (a carbon crucible may be used but the composition adheres more strongly), an "alloy" is obtained which is malleable, can be rolled or shaped and it does not exude chromium. Heating is at a temperature of 500° C. but gradually the temperature is brought up to 900° C. to 250° C. and held for about 25 minutes in that atmosphere. The time at temperature may be longer or shorter. The "alloy" is held in a protected atmosphere and cooled until it is solidified. Typically, chromium does not form an alloy with tin and lead and it is believed that it is justifiable to call the obtained composite an "alloy" as it can be rolled or shaped. The melting point of a 60—40 tin lead plus 5% chromium alloy is slightly higher than tin.

Subsequently, it was found that when the quartz crucible was used with the composition as indicated in the previous example adherent coatings were formed on the quartz crucible.

After rolling the alloy material, shapes of various configuaration were punched out and placed on graphite, carbon or polished silicon slice and heated to a temperature of 950° C. in a protective atmosphere of carbon monoxide, nitrogen, hydrogen or mixtures of these (but preferably carbon monoxide); the shape thus placed on the substrate then thoroughly wets the surface (zero or negative angle of contact). The surface is solderable where the shape has been deposited. The deposited preform, when worked up can be used for joining graphite or silicon in sandwich form, as above. For silicon metal, the above illustrated composition can be used or a 90% tin—10% chromium composition employed.

The preform can be joined with copper by merely placing it in contact with Cu in an inert atmosphere. The coating may also be "shaved" and made thinner and a copper leaf or foil placed on to make bronze. Copper "soaks" up tin and raises the melting point or the preform. Of course, copper, when so joined to graphite can also be readily soldered. Variation of time and/or temperature has a definite effect on the migration, i.e., penetration of copper into tin (or tin alloy), both into the graphite or into copper with an increase in the force needed for breaking the copper-tin-graphite bond. These variations are easily established. Generally breaking failure occurs in the graphite substrate.

When the above example is followed, tin-molybdenum, (90% tin—10% molydbenum), alloy is formed and used as a preform alloy such as on silicon metal.

When this material was used in a thin sheet (0.003 inches) to join a thin sheet of molybdenum, an electrical current rectifier of silicon-molybdenum was produced. A temperature of about 900° C. and carbon monoxide was used in that stage of process. Other composites that were formed were: graphite-tin-chromium (90%—10%) with tool steels; 303 stainless steel; cast iron; low carbon steel, etc.

C. Powder Preform Fabrication

If the powders of the tin, tin alloy, lead, lead alloy, indium, indium alloy, with the above carbide or carbonyl former are admixed and pressed to form "green" porous compacts (or preforms), and the carbon, i.e., graphite or silicon substrate, held in a carbon monoxide atmosphere such as up to 1000° C. or lower, e.g. 800° C., then an equivalent or better result is obtained from that given for methods A. or B. above when later forming composites.

Following the above procedure, the following composite film formers were employed for coating on graphite (graphite was available from Dixon Crucible, Bay City, N.Y.): vanadium-tin, titanium-tin, chromium-tin, chromium-lead, and chromium-indium colloidal suspensions.

When a graphite substrate is treated according to the above procedure with the preform "alloy" or green compact and is then subsequently coated with a tin metal and heated, the tin metal will not dewet and ball up on the surface of the graphite.

These coated products were useful, such as for brushes (electrodes) for electrical motors, flat crucibles for growing silicon single crystals from molten silicon. Other composite substrates were formed for bonding metals to graphite to reduce structural brittleness of graphite structures, e.g. for graphite bearings, etc. In the above recited combination, aluminum oxide and sapphire can be used in ceramic heaters and seals, quartz in quartz heaters or for glass to metal seals, etc. Carbides of the above carbide formers, including boron carbide can be used as abrasives (and it is also believed boron nitride), Exceptionally strong bonds are formed with the above recited "active" alloys, such as with silicon carbide.

As a result, abrasives of well known types, e.g. carbides, oxides, e.g. alumina or zirconia and diamonds, can now be formed into various useful shapes for use in abrasive wheels, belts, drill heads, (oil field drilling), etc. Carbon-fiber-metal composites can also be formed (80% tin-10% nickel—10% vanadium), because the tin prewetted carbon fibers can now be readily incorporated in other metals, e.g. copper. The same metal reinforced structures may also be formed from whisker carbides, e.g. boron carbides, or whisker oxides, useful for such as, structural load bearing components, e.g. aluminum oxides, zirconium oxides with metals or used for reinforcing, e.g. abrasive wheels.

As a result, dense pyrolytic graphite, graphite, carbon, carbon fiber, etc. structures, or whisker reinforced structures, can now be usefully formed in various shapes having various novel strength properties heretofore unknown.

When the above general example was followed, except that the refractory carbide or carbonyl former was first deposited and then a colloidal layer of tin deposited thereon and the same annealing procedure in a hydrogen atmosphere followed, the intermediate composite would not provide a non-dewetting substrate for tin upon a subsequent deposition of a tin layer thereon. In fact, the tin layer when so deposited, would dewet at an elevated temperature such as 232° C., its melting point. If the same example were followed and tin was deposited in a thin colloidal layer on top of graphite without the carbide or carbonyl former being present and the carbide or carbonyl former thereafter deposited thereon and the annealing procedure followed after each step or after the two depositions, the tin coating, if subsequently deposited on this, thus treated substrate, would again dewet.

As it is evident from the above, the unexplainable synergistic interaction takes place only on the conjoint, powder or colloidal distribution and annealing at high temperatures of a mixture of the refractory carbide or carbonyl former and tin, lead or indium material and in the presence of carbon monoxide.

While a colloidal or powder suspension has been used in the above examples, colloidal suspensions are merely one illustration of a dispersion. Uniform distribution of the coating(s) may also be achieved such as by painting with a vehicle in which suitably the above components are dispersed. Moreover, mixtures of the above carbide or carbonyl formers of various kinds may also be employed in the coating. Further, other dispersion depositions, such as sputtering or vaporizing, may be used for forming the conjoint distribution of tin and carbide former appropriately selected to achieve the desired end result as long as the carbon monoxide atmosphere is present. While the carbon monoxide content in the atmosphere can be less than 100%, it has been found that best results are obtained in a 100% carbon monoxide atmosphere.

As discussed above, various alloys of tin, e.g., tin-lead, and of the other coating formers, i.e., lead and indium may also be used. These alloys must be such that when using the recited carbide or carbonyl formers incompatible, i.e., non-alloying mixtures do not form. A ready test for incompatibility is dewetting of the deposited coating, e.g. on the graphite. Another is the flaking or peeling of the coating which signifies the lack of chemical bond formation between the graphite, i.e. carbon substrate and the coating. This test is also a ready test to establish the active state of the alloy. Another test is the zero or negative angle of wetting of the substrate, e.g. graphite. While these tests may appear functional, the ready means for establishing "activity" should be self evident, especially in a laboratory or in a field test by visual inspection. It is also necessary to work with a dispersion of the carbide former and the deposited component and the alloys, within compatibility regions for the alloy components. These are very complex and therefore are best established by the above tests, e.g., dewetting and peeling or flaking. These tests are best carried out by repeated heating and cooling cycles at progressively higher temperatures. According to the above tests, the composites as disclosed herein behaved satisfactorily. When graphite structures are joined with preforms of the above described "alloys" and the resistance measured between the preform deposit of graphite and alloy, no increase was observed with ordinary type of resistance detectors, i.e., ohmeter which measures in milliohms. This is a test which seems to indicate that carbides are not formed in the "active" alloy formation because carbide formation would indicate an increase in resistance. However, the possibility that some carbide formation may take place has as yet not been established.

Similarly, when graphite structures are joined with preform "alloys" exceptionally strong structural bonds are formed. When preforms are joined to silicon, a very good collecting capacity for silicon cell may be obtained which is not subject to oxidative deterioration. Hence, the life of a silicon solar cell can be increased with less expensive fabrication techniques. When forming the so called preform "alloys", it was found that when the alloy was not formed in a carbon monoxide atmosphere, e.g. chromium would exude from tin. For example, 5, 10 or 15% chromium, balance tin do not form alloys according to conventional phase diagrams. However, when formed according to the present invention, these elements in the same proportions form "active" alloys. Hence, according to the present invention, alloys are made which are believed to be novel and comprise the above "tin group" metals and the carbide and carbonyl formers (as metals). These alloys must be formed in carbon monoxide systems, and preferably from the powder form, although hot pressing and then treating the powders in carbon monoxide, also gives an excellent alloy. Other illustrative species of the heretofore unknown alloys are alloys of tin and molybdenum, e.g. in the range from 5 to 10% molybdenum, balance tin.

Without being bound by any theory, but merely for explanation, it is believed that in carbon monoxide system, chromium, tin, lead or indium, or tin, lead or indium alloys, (as well as the other carbide or carbonyl formers of the above group), synergistically interact to cause one or more of the components, e.g., chromium to form a very active species probably in-situ and in the presence of carbon monoxide, so that the compound or complex when cooled behaves as if it were an "alloy". These compositions are sufficiently "alloyed" so as not to exude or separate out the carbide forming materials, yet these are sufficiently "active" in a reaction sense so as to adhere atomically, (apparently), to carbon, silicon and the other substrates. These various combinations form the tightly adhering coatings, layers and structures providing heretofore non-observed advantages.

What is claimed is:

1. A composite of tin, lead, indium, a tin alloy, a lead alloy or an indium alloy, as a component, in combination with a carbide or carbonyl former, as an adherent coating, film or layer on a base or substrate of a carbon, diamond, silicon, a carbide, alumina, zirconia, sapphire or quartz structure which is non-dewettable upon heating and of a zero to negative angle of contact between the adherent coating and said base or substrate.

2. The composite as defined in claim 1, wherein the carbide or carbonyl former is chromium, titanium, hafnium, zirconium, cobalt, iron, nickel, manganese, rhenium, ruthenium, rhodium, osmium, iridium, vanadium, niobium, tantalum, tungsten or molybdenum, or mixtures of same.

3. The composite as defined in claim 1, wherein the base structure is graphite.

4. The composite as defined in claim 3, wherein the base structure is pyrolitic graphite.

5. The composite as defined in claim 1, wherein the substrate is alumina or sapphire.

6. The composite as defined in claim 1, wherein the substrate is a carbide.

7. The composite as defined in claim 1, wherein the carbide is silicon carbide.

8. The composite as defined in claim 1, wherein the carbide is boron carbide.

9. The composite as defined in claim 1, wherein the carbide is a mixed carbide.

10. The composite as defined in claim 1, wherein the carbide is tungsten carbide.

11. The composite as defined in claim 1, wherein the substrate is diamond, iron is the carbide former with tin in a ratio of about 5 to 95.

12. The composite as defined in claim 1, wherein the carbide former is chromium.

13. The composite as defined in claim 1, wherein the carbide former is vanadium.

14. The composite as defined in claim 1, wherein the carbonyl former is nickel in admixture with vanadium.

15. The composite as defined in claim 1, wherein the tin alloy is a tin-lead alloy.

16. The composite as defined in claim 1, wherein said component is lead.

17. The composite as defined in claim 1, wherein said component is indium.

18. The composite as defined in claim 1, wherein the same comprises further, an overlay, on said coating, film or layer on said substrate of one of the substrate materials, or a metal alloyable with said coating, film or layer on said base substrate.

19. The composite as defined in claim 18, wherein the overlay is copper on a tin-chromium-graphite composite.

20. The composite as defined in claim 18, wherein the overlay is graphite.

21. The composite as defined in claim 18, wherein said base substrate is silicon, and the coating is of tin and molybdenum and the overlay is molybdenum.

22. The composite as defined in claim 18, wherein said base structure is graphite and said overlay is carbon.

23. The composite as defined in claim 18, wherein the same is a sandwich of graphite on which there is a coating, layer or film of tin-chromium, and an overlay of copper and said copper in turn is next to a graphite with a coating, layer or film of tin-chromium on a graphite substrate.

24. As an alloy, a carbide or carbonyl former, in a metal form, with a "tin group" metal of tin, a tin alloy, lead, a lead alloy, indium, or an indium alloy, in a ratio of 1% to 40% of said carbide or carbonyl former balance said tin group metal, whereby said alloy is characterized inter alia by forming in a carbon monoxide atmosphere a layer on a substrate as defined in claim 1, with zero or negative angle of contact upon heating and melting the same on said substrate, and non-dewetting upon repeated heat cycling.

25. The alloy as defined in claim 24, wherein the same is chromium-tin in the range of 5 to 15%, chromium, balance tin.

26. The alloy as defined in claim 24 wherein the same is molybdenum-tin in the range of 5 to 10% molybdenum, balance tin.

27. The preform alloy as defined in claim 24, wherein the same is tin-lead-chromium alloy wherein the same is 60% by weight of tin and 40% by weight of lead and added to the tin-lead is 10 to 3% by weight of chromium based on the total weight of tin and lead.

28. A green compact of powder comprised of tin, tin alloy, lead, lead alloy, indium, indium alloy with said carbide or carbonyl former, as a metal powder, wherein the carbide or carbonyl former is as defined in claim 2.

29. The composite as defined in claim 1, wherein the carbide or carbonyl former is nickel, chromium, titanium, zirconium, vanadium, tungsten or molybdenum.

30. A method for preparing a preform alloy as defined in claim 24, comprising the steps of: admixing a particulate of tin, lead, indium, or alloys of each of the foregoing, with a particulate of a carbide former, or carbonyl former in the form of their metals, to form an admixture, reacting said admixture up to and at the melting point of said admixture, in the presence of carbon monoxide atmosphere, cooling said admixture in the presence of said carbon monoxide atmosphere or carbon monoxide in an admixture with a inert gas or cooling in an inert atmosphere of hydrogen or hydrogen and nitrogen, and recovering said admixture as an "active" alloy.

31. The method as defined in claim 28, wherein the particulates are in an admixture in a size range from colloidal, 350 mesh (U.S.) to ⅛ inch.

32. A method of forming discrete adherent layers on a substrate as defined in claim 1, comprising the steps: forming a preform into a shape, placing said shape on said substrate and heating said perform shape and/or said substrate in a carbon monoxide atmosphere or in an atmosphere of mixtures of carbon monoxide with an inert gas until wetting occurs and forms a discrete layer with a zero to negative angle of contact on said substrate and recovering said substrate.

33. The method as defined in claim 18, wherein graphite structure is annealed with a preform placed thereon in an inert atmosphere of hydrogen and/or nitrogen.

* * * * *